(12) United States Patent
Flytzani-Stephanopoulos et al.

(10) Patent No.: US 8,394,736 B2
(45) Date of Patent: Mar. 12, 2013

(54) TREATING CATALYSTS

(75) Inventors: Maria Flytzani-Stephanopoulos, Winchester, MA (US); Xiaoyan She, Richland, WA (US)

(73) Assignee: Tufts University, Medford, MA (US)

( * ) Notice: Subject to any disclaimer, the term of this patent is extended or adjusted under 35 U.S.C. 154(b) by 0 days.

(21) Appl. No.: 13/119,507

(22) PCT Filed: Sep. 22, 2009
(Under 37 CFR 1.47)

(86) PCT No.: PCT/US2009/057781
§ 371 (c)(1),
(2), (4) Date: Aug. 26, 2011

(87) PCT Pub. No.: WO2010/033964
PCT Pub. Date: Mar. 25, 2010

(65) Prior Publication Data
US 2012/0128562 A1    May 24, 2012

Related U.S. Application Data

(60) Provisional application No. 61/099,000, filed on Sep. 22, 2008.

(51) Int. Cl.
*B01J 23/48* (2006.01)
*B01J 37/00* (2006.01)

(52) U.S. Cl. ........ 502/218; 502/317; 502/325; 502/439; 502/500; 423/239.1

(58) Field of Classification Search .................. 502/218, 502/317, 325, 439, 500; 423/239.1
See application file for complete search history.

(56) References Cited

U.S. PATENT DOCUMENTS

| 5,534,237 A | 7/1996 | Yoshida et al. |
| 5,747,410 A | 5/1998 | Muramatsu |
| 2005/0002843 A1 | 1/2005 | Du-Soung |
| 2006/0252643 A1* | 11/2006 | Pak .............................. 502/439 |

OTHER PUBLICATIONS

She et al. "Activity and stability of Ag-alumina . . . " Catalysis Today, vol. 127 (2007), pp. 207-218.*

* cited by examiner

*Primary Examiner* — Timothy Vanoy
(74) *Attorney, Agent, or Firm* — Occhiuti Rohlicek & Tsao LLP

(57) ABSTRACT

A method includes contacting a catalyst including a metal having an average particle size of approximately one nanometer or greater with $SO_2$; and reducing the average particle size of the metal.

25 Claims, 16 Drawing Sheets

EDS: Ag 1.18at%, S 0.64 at%, Al 51.26 at%, O 46.92 at%

EDS: Ag: 77.56at%, Al: 19.13at%, O: 3.31at%

TREATING CATALYSTS

CROSS-REFERENCE TO RELATED APPLICATIONS

This application is the National Stage of International Application No. PCT/US2009/057781, filed on Sep. 22, 2009, which claims the priority of U.S. Provisional Patent Application No. 61/099,000, filed on Sep. 22, 2008. The contents of both applications are hereby incorporated by reference in their entirety.

STATEMENT OF GOVERNMENT SUPPORT

This invention was made with government support under 0304515 awarded by the National Science Foundation. The government has certain rights in the invention.

FIELD OF THE INVENTION

The invention relates to methods of treating catalysts.

BACKGROUND

Silver catalysts can be used for ethylene epoxidation and appear promising for selective catalytic reduction (SCR) of $NO_x$ with hydrocarbons. For example, silver catalysts have potential application in SCR of $NO_x$ with hydrocarbons or oxygenates to remove nitrogen oxides from various exhaust gas effluents. The promise of the silver catalysts lies in their high activity, high selectivity to dinitrogen, and moderate resistance to $H_2O$ and $SO_2$. However, sintering (i.e. particle growth) can be a serious issue for silver catalysts, Gold atoms/clusters are very active catalysts for a number of reactions, including low-temperature CO oxidation, water-gas shift (WGS) reaction, alcohol steam reforming reaction, selective hydrogenation, selective oxidation reaction, and SCR of NOx with hydrocarbons. See Haruta et al., *J. Catal.* 144, 175 (1993). For some reactions, such as WGS reaction, atomically dispersed gold strongly bound to an oxide compound provides the active sites for the reaction. See Fu et al., *Science* 301: 935-938 (2003); Deng et al., *Topics in Catalysis* 44:199-208 (2007); and Deng et al., *J. Phys. Chem. C* 112: 12834-12840 (2008). Sintering of gold atoms/clusters to particles of size greater than 1 nm can be a serious issue for gold catalysts in WGS reaction, e.g., causing deactivation with time-on-stream.

A complex array of factors has been attributed to sintering, including the reaction gas environment, support effects, and surface binding and mobility.

There is a need for developing a process to reduce the particle size and re-disperse the silver, gold, or other metal catalysts on different surfaces.

SUMMARY

In one aspect, the invention features re-dispersion of a catalyst on a substrate by $SO_2$. For example, $SO_2$ can re-disperse a metal-containing catalyst (such as silver particles) on a reaction aged silver-alumina surface at 625° C. by $SO_2$. As a consequence, the SCR activity of high-content $Ag/Al_2O_3$ can be tuned to higher values by addition of $SO_2$, as the silver particles disappear and dispersion is increased. These findings can be applied, for example, for treatment of engine exhaust gases containing residual sulfur, or for regeneration of catalysts, such as sintered or reaction-aged catalysts.

In some embodiments, in the absence of $SO_2$, severe sintering of catalyst particles (e.g., silver particles) takes place in a reaction gas at 625° C. and the particles agglomerate into large clusters of micrometer size. However, the presence of $SO_2$ can stabilize the particles in a dispersed state on a substrate (e.g., alumina) and suppress deactivation. In other embodiments, $SO_2$ reduces the size of gold nanoparticles and re-disperse gold onto an iron oxide surface. The re-dispersed gold is present on the surface of the iron oxide in the form of clusters of a few gold atoms. The size of the gold cluster is typically not greater than 1 nm. This re-dispersed gold catalyst is particularly desirable for WGS reaction.

In another aspect, the invention features a method including contacting a catalyst including a metal having an average particle size of approximately one nanometer or greater with $SO_2$; and reducing the average particle size of the metal.

Embodiments may include one or more of the following features. The catalyst can include the metal (e.g., silver or gold) supported on a substrate (e.g., alumina or iron oxide). The metal can have a concentration of at least 0.3 wt % (e.g., at least 0.5 wt %). Before reducing the average particle size, the average size can be approximately 2 nanometers or greater (e.g., 5 nanometers or greater, or 100 nanometers or greater). The $SO_2$ can be in a mixture of gases and have a concentration of at least 10 ppm (e.g., at least 50 ppm). The catalyst can be contacted with $SO_2$ at a temperature between 400° C. and 600° C. for at least 2 hours (e.g., at least 4 hours). The catalyst can be contacted with $SO_2$ at 600° C. or higher for at least 0.1 hours. The contacting step can be performed in a catalytic reaction that requires the catalyst (e.g., SCR or WGS reactions). The methods described above can further include, e.g., prior to contacting the catalyst with $SO_2$, heating the catalyst in an environment substantially free of $SO_2$ or in an environment having $SO_2$; performing selective catalytic reduction (e.g., of $NO_x$) with the catalyst; or contacting the catalyst with $NO_x$ and/or $CH_4$. The methods described above can also include performing a reaction (e.g., in the presence of $SO_2$) using the catalyst, and again reducing the average particle size of the metal or re-dispersing the catalyst. In other words, the methods can further include catalyzing a reaction using the catalyst, in which the catalyst remains dispersed or the reduced average particle size of the metal remains substantially unchanged or is further reduced.

Average particle sizes can be determined by transmission electron microscopy (TEM) or X-ray powder diffraction (XRD). For example, the particle size distribution can be obtained and average particle sizes calculated from 10-100 measurements of particle sizes using TEM. Alternatively, the average particle size can be calculated using XRD using the Scherrer equation.

The details of one or more embodiments are set forth in the accompanying description below. Other aspects, features, and advantages will be apparent from the following drawings, detailed description of embodiments, and also from the appending claims.

DETAILED DESCRIPTION

Figure 1:
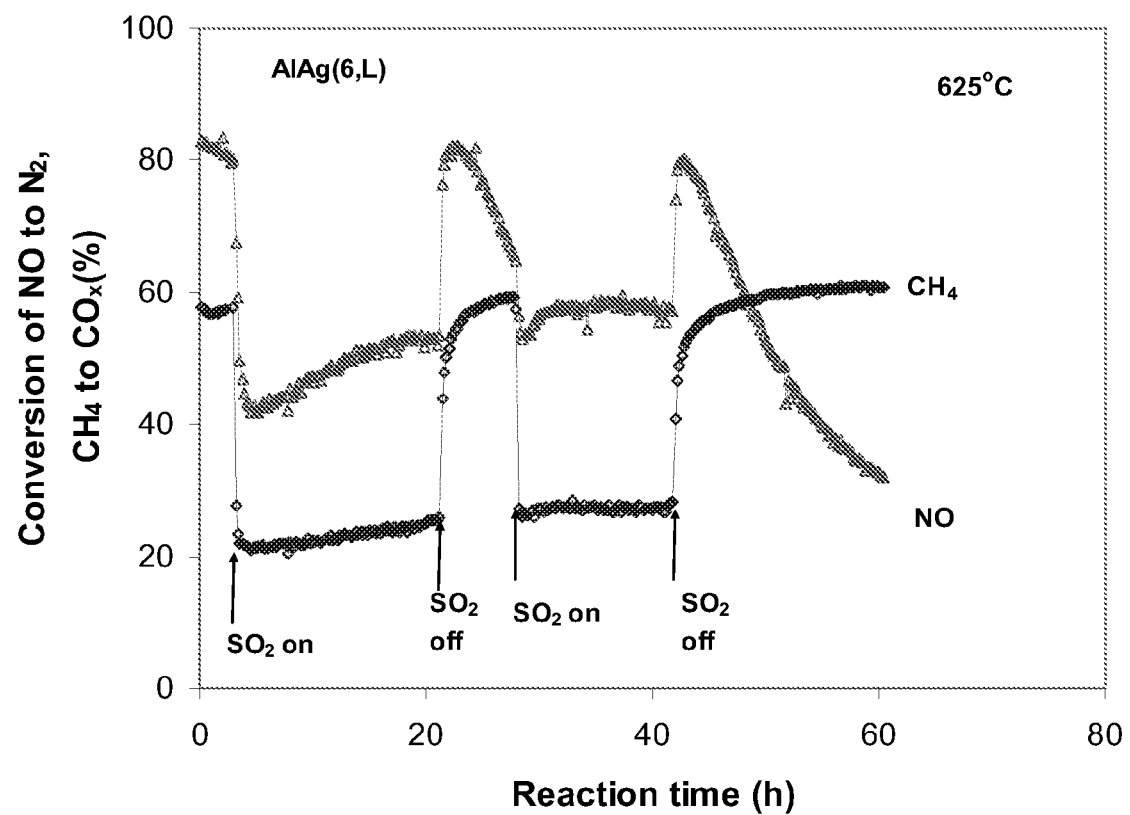
FIG. 1 is a plot of conversion of NO to $N_2$ and $CH_4$ to $CO_x$ vs. time that shows effects of $SO_2$ on the SCR of NO with $CH_4$ over AlAg (6,L). The conditions included: catalyst load: 0.15 g; feed gas: 0.25% NO-2% $CH_4$-5% $O_2$-0/1000 ppm $SO_2$—He, 200 ml/min; T=625° C.; and Space Velocity (SV)=50,000 $h^{-1}$.

Silver-containing catalysts, such as silver particles on an $Al_2O_3$ substrate used in selective catalytic reduction (SCR), can be re-dispersed by $SO_2$. For example, silver-containing particles having a large average particle size (e.g., due to sintering, reaction aging, and/or synthetic preparation) can have their average particle size reduced and be re-dispersed. As a result, the catalysts can be regenerated and re-used, and the activity of the catalysts can be enhanced, thereby enhancing the overall performance of the catalysts.

The catalyst particles can be re-dispersed by contacting the catalysts with flowing $SO_2$ gas. The $SO_2$ gas can be a portion of a mixture of gases including, for example, $NO_x$, $CH_4$, $O_2$, and/or one or more inert gases (such as He, $N_2$, or Ar). In some embodiments, the concentration of $SO_2$ in a mixture of gases ranges from approximately 0.005% to approximately 0.5%, or from approximately 50 ppm to approximately 5000 ppm.

The temperature and time used to re-disperse the catalyst particles can vary. The temperature can be greater than approximately 600° C., for example, from approximately 600° C. to approximately 700° C. The time used to re-disperse the catalyst particles can vary from approximately 0.1 hr to approximately 5 hr. A variety of gas flow rates can also be used to re-disperse the particles (e.g., 100-300 mL/min). A contact time of the order of 1 second can be adequate for re-dispersing the particles.

The catalysts can be in the form of catalytic particles (e.g., silver particles) supported on a substrate. The concentration of the catalytic particles can range from approximately 0.5 wt % to approximately 20 wt %. In some embodiments, the catalytic particles have an average particle size of approximately one nanometer to approximately 1000 nanometers prior to re-dispersion. After re-dispersion, the catalytic particles have an average particle size less than the average particle size prior to re-dispersion. In some embodiments, after re-dispersion, the catalytic particles have an average particle size of less than one nanometer. Examples of substrates include aluminum oxide, silicon oxide, zirconium oxide, magnesium oxide, titanium oxide, zeolites or other molecular sieve materials, and other oxide and non-oxide supports.

In addition to being capable of re-dispersing silver, $SO_2$ can also stabilize the structure and activity of $Ag/Al_2O_3$ for SCR of $NO_x$ with $CH_4$, for example, in an exhaust gas mixture. The reaction can be performed above 600° C. to keep the surface of the catalyst only partially sulfated. In $SO_2$-free gases, deactivation can be fast and measurable at these temperatures. Time-resolved TEM analyses have determined that deactivation is due to sintering of silver from well dispersed clusters to nanoparticles to even micrometer-size particles with time-on-stream at 625° C. However, sintering of silver can be dramatically suppressed by the presence of $SO_2$ in the reaction gas mixture. The structural stabilization by $SO_2$ was accompanied by stable catalyst activity for the NO reduction to $N_2$. The direct oxidation of methane was suppressed, thus the methane selectivity was improved in $SO_2$-laden gas mixtures. In tests with high-content silver alumina with some of the silver in metallic form, an increase in the SCR activity was found in $SO_2$-containing gas mixtures. It is believed that this effect was a result of re-dispersion of silver by $SO_2$. The performance was reversible over many cycles of operation at 625° C. with the $SO_2$ switched on and off in the gas mixture. As a result, for example, a first SCR can be performed with the catalyst, in the absence or presence of $SO_2$; the catalytic particles can be re-dispersed with $SO_2$; and a second SCR can be performed with the re-dispersed particles. This process can be repeated.

All references indicated herein are incorporated by reference in their entirety.

The following examples are illustrative and not intended to be limiting.

EXAMPLE 1

Silver-alumina catalysts were prepared using a co-precipitation-gelation (co-gel) method as described in A. Keshavaraja, X. She, and M. Flytzani-Stephanopoulos, "Selective Catalytic Reduction of NO with $CH_4$ over Ag-alumina catalysts," *Appl. Catal. B*, 27, L1-L9 (2000). Briefly, stoichiometric amounts of aluminum nitrate (Fluka, 99%) and silver nitrate (Aldrich, 99.9%) were dissolved completely in deionized water and an aqueous solution of tetra-methylammonium hydroxide (25%) was quickly added to the nitrate solution under constant stirring to an end point pH=8-9. The resultant pale yellow/grey-colored gelatinous precipitate was aged for 8-10 h at room temperature, filtered and washed several times with deionized water, dried under vacuum at 100° C. for 8 h, followed by calcination at 650 and 800° C. (in two parts) for 10 h (heating rate: 2° C./min). The solid density was ~0.5 g/ml. Elemental analysis was performed by inductively coupled plasma (ICP) atomic emission spectrometry (Perkin Elmer Plasma 40) by dissolving the samples in HF and $HNO_3$ and diluting with deionized water.

Supported $Ag/Al_2O_3$ was prepared by incipient wetness impregnation of a high surface area $\gamma$-$Al_2O_3$ (Condea Puralox, S.A.~200 $m^2$/g). An aqueous solution of silver nitrate at the desired amount was added dropwise to the fine support powder. The impregnated samples were then dried at 100° C. for 12 h and calcined in air at 650° C. for 2 h. The as-prepared Ag-alumina catalysts are denoted as AlAg (x,CG), where x is the wt % of Ag and CG denotes the coprecipitation-gelation method applied.

Low-silver content Ag-alumina catalysts were prepared by leaching out the weakly bound silver on the parent catalysts with a dilute (10%) nitric acid solution, as described in X. She and M. Flytzani-Stephanopoulos, "The role of Ag—O—Al species in silver-alumina catalysts for the selective catalytic reduction of $NO_x$ with methane" *J. Catalysis* 237, 79-93 (2006). More specifically, leaching is performed by immersing each sample (~1.5 g) in 100 ml of 10% $HNO_3$ at room temperature for 8 h. After leaching, the recovered solids were washed with deionized water several times, dried in a vacuum oven (25 in Hg, 60° C.) for 10-12 h, and heated at a rate of 2° C./min to 650° C. and kept there for 3 h. Again, ICP analysis measured the amount of residual silver in the leached catalysts. The leached samples are denoted as AlAg (x, L), where x is the wt % of Ag, and L indicates a leached sample.

Catalytic activity measurements were carried out in a quartz tube (1 cm I.D) packed-bed flow reactor equipped with a K-type thermocouple and a temperature controller, as described in the references cited above. Specifically, ~0.15 g powder samples were loaded into the reactor, and a feed gas stream containing (mol %) $0.25NO-2CH_4-5O_2-0$ or $0.1 SO_2$-bal.He at 200 ml/min (Gas Hourly Space Velocity=50,000 $h^{-1}$) was introduced. Typically, the reaction took place at 625° C. at atmospheric pressure. At this (or higher) temperature, the catalyst surface is only partially sulfated and active for $CH_4$-SCR even in the presence of $SO_2$ in the gas. The reactor effluent was analyzed by a gas chromatograph (HP 5890), which was equipped with a thermal conductivity detector (TCD) and a 10 ft long×⅛-inch dia. 5 A molecular sieve column capable of separating NO, $CH_4$, $O_2$, $N_2$ and CO species. An FTIR (Mattson, Research Series 1), equipped with a 0.75 L/5.6 m gas cell operating at 150° C., was used to monitor the $SO_2$ concentration online.

Silver-alumina samples, both fresh and reaction-aged, were examined by high-resolution transmission electron microscopy and energy dispersive X-ray spectroscopy (HR-TEM/EDS) on a JEOL 2010 instrument equipped with a $LaB_6$ electron gun source with a resolution of 0.19 nm. The microscope was operated at 200 kV, and its attached EDS was also used for elemental analysis of selected areas. The sample preparation consisted of suspending the catalyst powders in isopropyl alcohol using an ultrasonic bath and then depositing them onto a carbon-coated 200 mesh Cu grid. Typically, for each sample, the particle size distribution was investigated over many areas of the samples, and representative pictures are shown.

To identify the crystalline phases, X-ray powder diffraction (XRD) analysis was performed on a Rigaku 300 X-ray diffractometer. Copper $K_\alpha$ radiation was used. The tube voltage was 60 kV, and the current was 300 mA.

TPO (temperature-programmed oxidation) was performed to check for carbon deposition on the Ag-alumina catalysts aged in either of the following two conditions: 1) sulfur-free: 625° C., 0.25% $NO$-2% $CH_4$-5% $O_2$—He, 24 h; and 2) with sulfur: 625° C., 0.25% $NO$-2% $CH_4$-5% $O_2$-0.1% $SO_2$—He, 24 h. Three catalysts, AlAg (6,L), AlAg (10.1,CG) and alumina, were examined. TPO was performed on a Micromeritics Pulse Chemisorb 2705 instrument. Typically, ~0.1 g of aged catalyst was charged into a U-shape sample holder, and 20% $O_2$/He at 40 ml/min was introduced at room temperature (RT). Then the sample was heated in this flowing gas mixture to 800° C. at 10° C./min. Signals of $O_2$ (32,16), CO (28), $CO_2$ (44, 28) and $H_2O$ (18) were monitored by mass spectrometry (MS), as well as some sulfur or nitrogen-containing species: NO (30), $NO_2$ (46), $N_2O$ (44), $SO_2$ (64, 48), $SO_3$ (80), $H_2S$ (34), COS (60), $CS_2$ (76) and $CH_2S$ (45). For the MS signal of CO (m/e=28), 0.12 of the $CO_2$ (44) signal was subtracted to account for CO produced by $CO_2$ cracking in the mass spectrometer ionizer. Similarly, for the m/e signal of NO (30), 2.7 times the signal of $NO_2$ (46) was subtracted to account for the NO produced from $NO_2$ whenever these two components showed up simultaneously.

$SO_2$ treatment of a pre-sintered Ag-alumina catalyst was conducted to examine whether $SO_2$ can re-disperse silver particles. The sample, AlAg (10.1,CG), was first aged in sulfur-free $CH_4$-SCR reaction (standard condition: 0.25% $NO$-2% $CH_4$-5% $O_2$) at 625° C. for 24 h. This aged catalyst is denoted as AlAg (10.1,CG)(625C-SCR-24 h). Sulfation of this $CH_4$-SCR-aged catalyst was performed in a fixed bed quartz flow. Firstly, the sample was heated from RT to 625° C. in He. Then, sulfation was performed in a flow of 516 ppm $SO_2$/He at 625° C. for specific lengths of time. Finally, the catalyst was cooled down to RT in the same $SO_2$ gas stream. The gas effluent from the reactor was monitored with a mass spectrometer (Mini-Lab). The sulfated catalyst was examined by TEM (JEOL 2010) and XRD (Philips, X'pert) to determine the dispersion and crystalline phases of silver.

$SO_2$-Stabilized $CH_4$-SCR Activity of Ag-Alumina

FIG. 1 shows the stabilization of the activity of the AlAg (6,L) catalyst in the presence of $SO_2$ in a cyclic addition/removal of $SO_2$ over the catalyst. As shown, addition of $SO_2$ causes a fast drop in the conversions of NO and $CH_4$, which are subsequently recovered after removal of $SO_2$. This behavior has been attributed to reversible adsorption of $SO_2$ onto the surface sites of Ag-alumina at 625° C. What is interesting is the stabilizing effect of $SO_2$ on the SCR activity of AlAg (6,L), as can be seen in FIG. 1. Under $SO_2$, both the NO conversion to $N_2$ and $CH_4$ conversion to $CO_x$ were stable with time (up to 18 h of time-on-stream). On the contrary, in the absence of $SO_2$ from the reaction gas mixture, a continuous drop in NO conversion was found. For example, after the last cycle in FIG. 1, when $SO_2$ was switched off, the conversion of NO to $N_2$ decreased from 82% to 32% in 18 h, while the conversion of $CH_4$ to $CO_x$ was maintained with time.

As a result, the examples below were used to investigate the role played by potential structural changes of silver on 1) the deactivation of Ag-alumina catalysts in the absence of $SO_2$; and 2) the enhanced stability of Ag-alumina in the presence of $SO_2$.

Deactivation in $SO_2$-Free Gas Streams

As shown in FIG. 1, the NO conversion to $N_2$ decreases continuously with time-on-stream in the absence of $SO_2$. Sintering phenomena (e.g., silver particle growth) or fouling due to carbon deposition are common causes of deactivation. The catalysts were examined for carbon deposition by subjecting them to TPO after they were aged in the absence of $SO_2$. No carbon deposition was evident from the TPO results (not shown) and this deactivation route was ruled out. For comparison, TPO was also performed for a sample aged in the presence of $SO_2$, and again no evidence for carbon deposition was found.

Figure 2A:
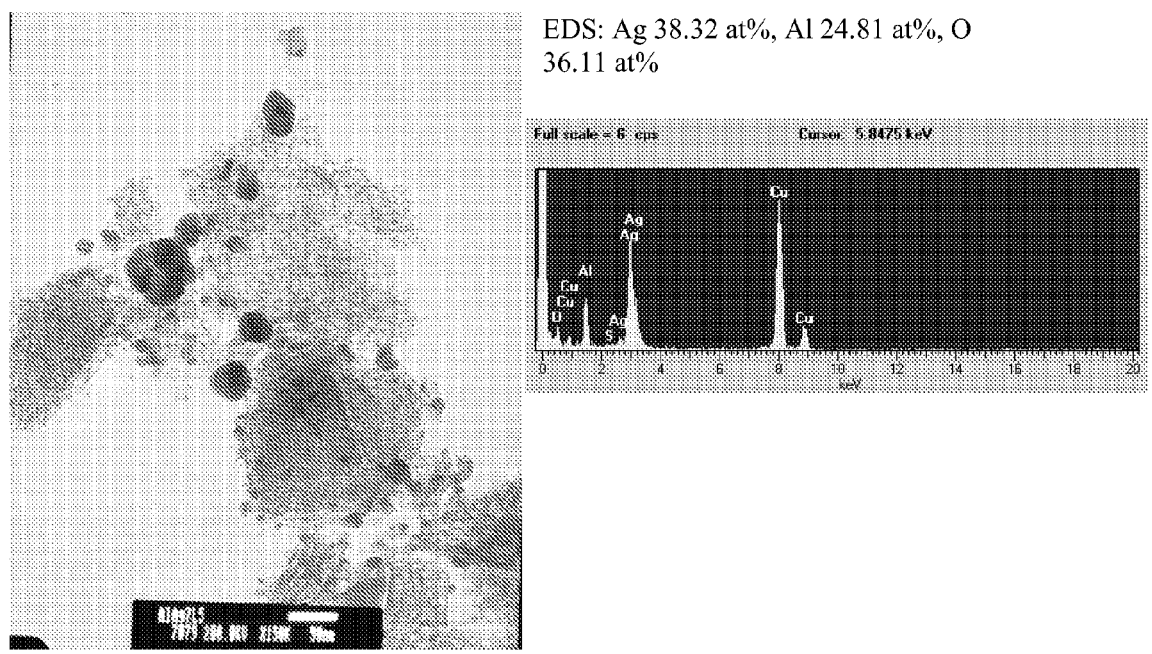
FIGS. 2(a), 2(b) and 2(c) are high-resolution transmission electron microscopy (HRTEM) images of AlAg (7.1,L) aged in the absence of $SO_2$ for 5 h, 48 h and 60 h, respectively. The aging conditions included 0.25% NO-2% $CH_4$-5% $O_2$—He.
Figure 2B:
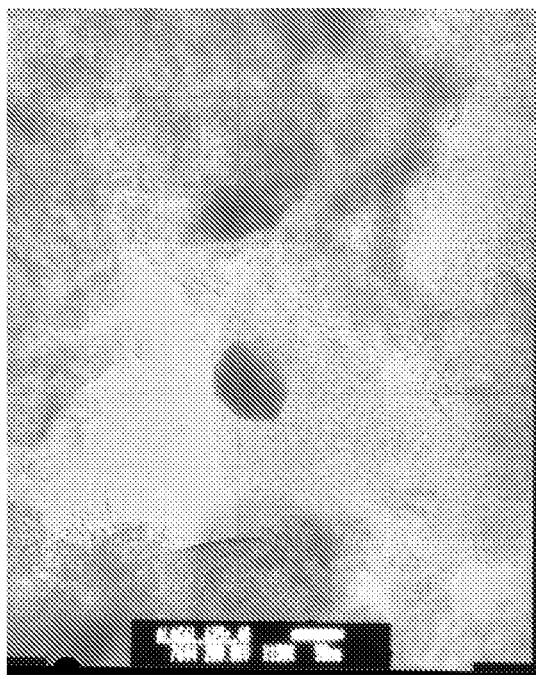
Figure 2B:
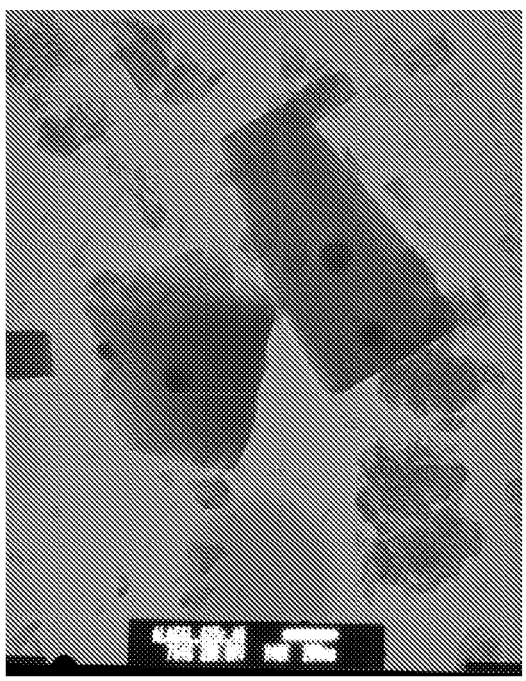
Figure 2B:
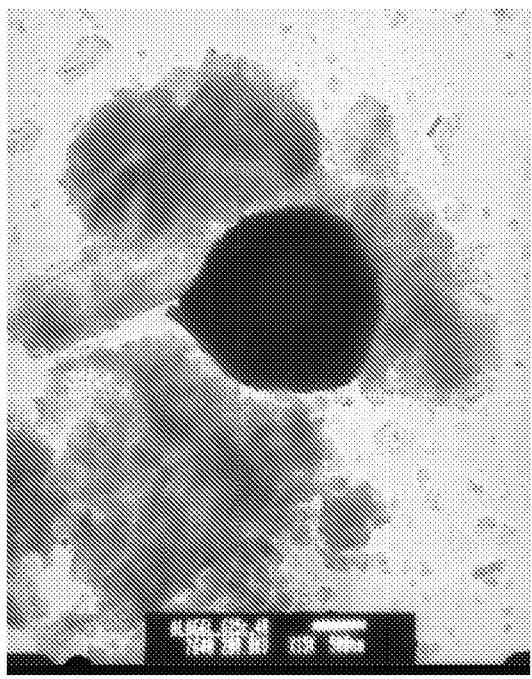
Figure 2B:
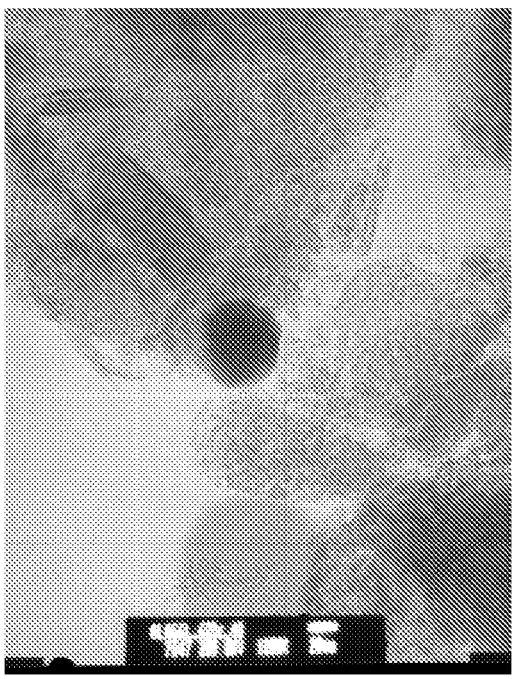
Figure 2C:
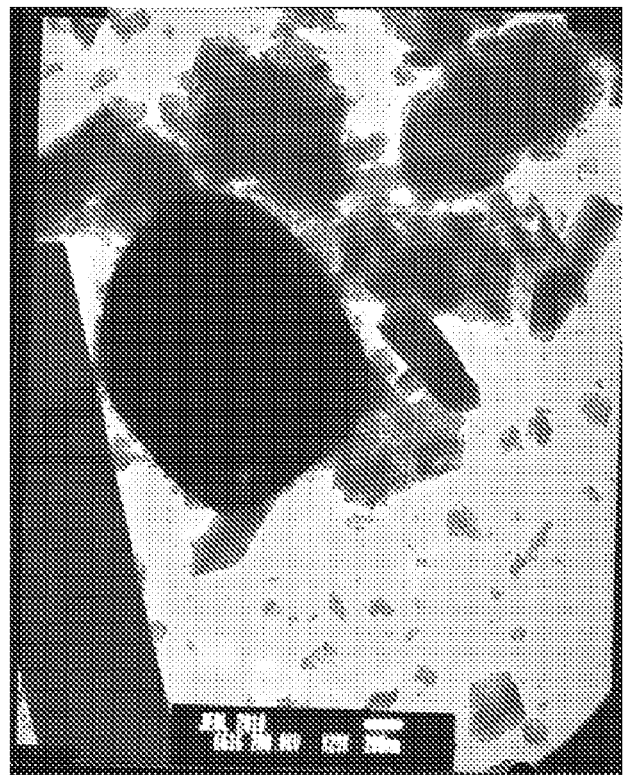
Figure 2C:
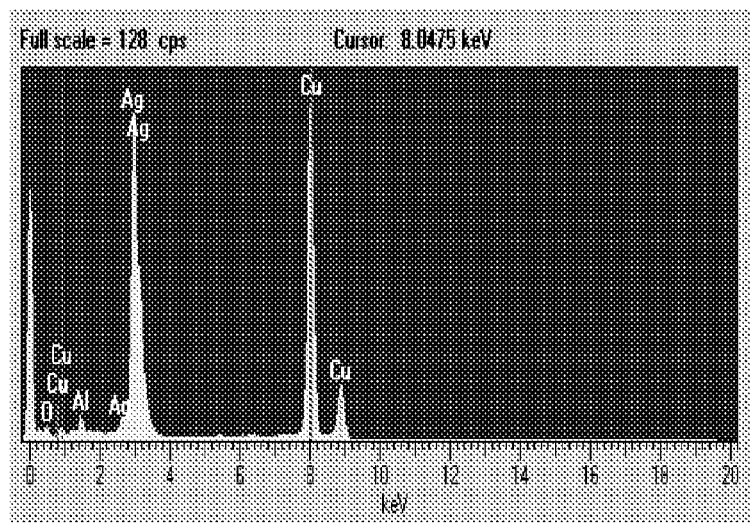

Catalyst sintering, another common cause of catalyst deactivation, was investigated next. Silver particle sintering is known to occur readily on various supports. To examine this possibility, TEM was performed for the Ag-alumina catalysts aged in the absence of $SO_2$ for various lengths of time, as shown in FIGS. 2(a), 2(b) and 2(c). FIGS. 2(a), 2(b) and 2(c) show TEM images of AlAg (7.1,L) aged in $CH_4$—NO—$O_2$ at 625° C. for 5 h, 48 h and 60 h, respectively. After aging for 5 h, small silver nanoparticles of approximately 10-20 nm average size were clear (FIG. 2(a)), indicating destabilization of silver compared to the highly dispersed [Ag—O—Al] species in a fresh sample.

With further reaction in the above gas mixture, growth of silver particles became more pronounced, as can be seen in FIGS. 2(b) and 2(c). After 48 h-on-stream (FIG. 2(b)), big silver agglomerates reaching micrometer size were observed, together with some silver particles <100 nm. A large clump of silver >1 µm was found after 60 h-on-stream (FIG. 2(c)). These results show severe sintering of silver particles during the $CH_4$-SCR reaction at 625° C.

Comparing this data to the NO conversion drop in the absence of $SO_2$ (FIG. 1), without being bound by theory, it is believed that the observed deactivation is due to silver sintering and hence loss of active sites for the catalytic reaction.

Figure 3A:
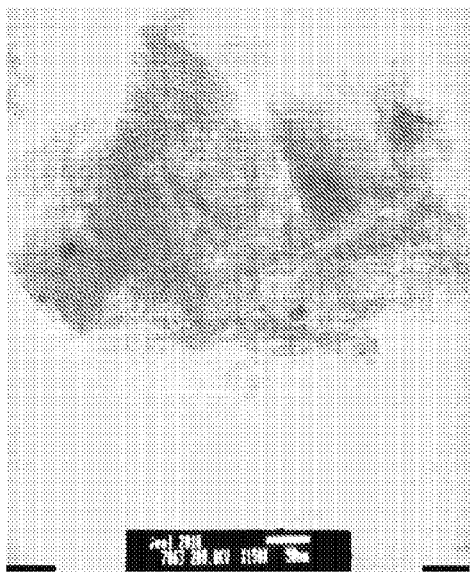
FIGS. 3(a) and 3(b) are HRTEM images of AlAg (7,L) aged in the presence of $SO_2$ aged for 10 h and 67 h, respectively. The aging conditions included: 0.25% NO-2% $CH_4$-5% $O_2$-1000 ppm $SO_2$—He; and T=625° C.
Figure 3A:
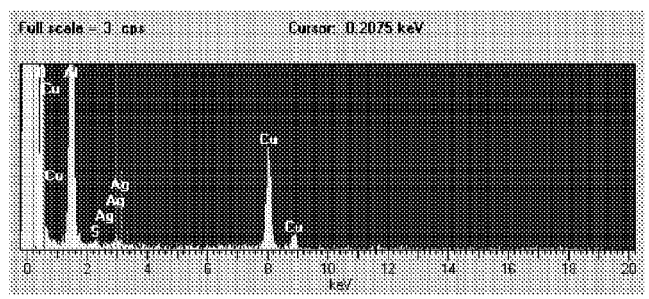
Figure 3A:
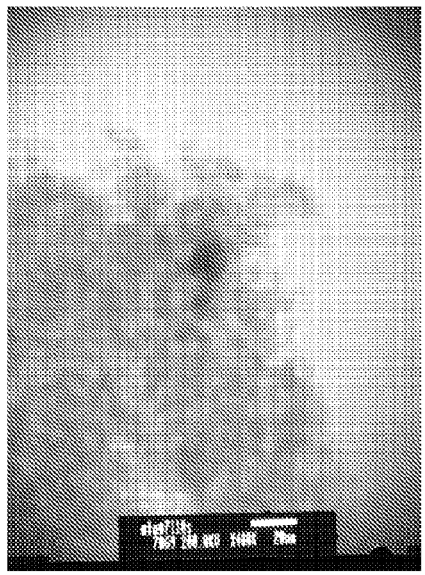
Figure 3A:
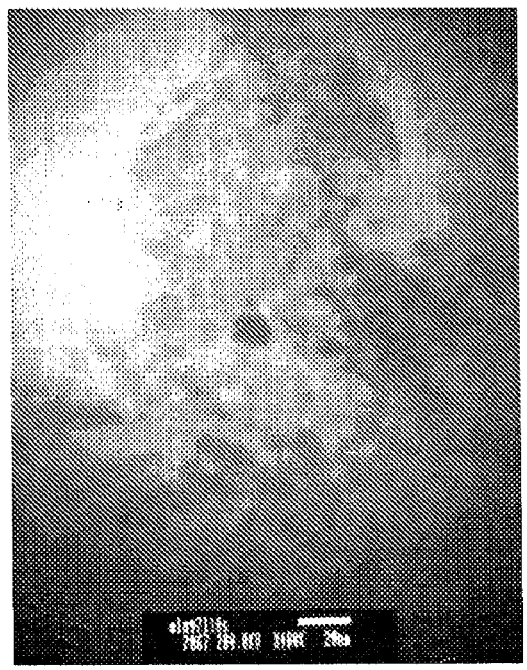
Figure 3A:
Figure 3B:
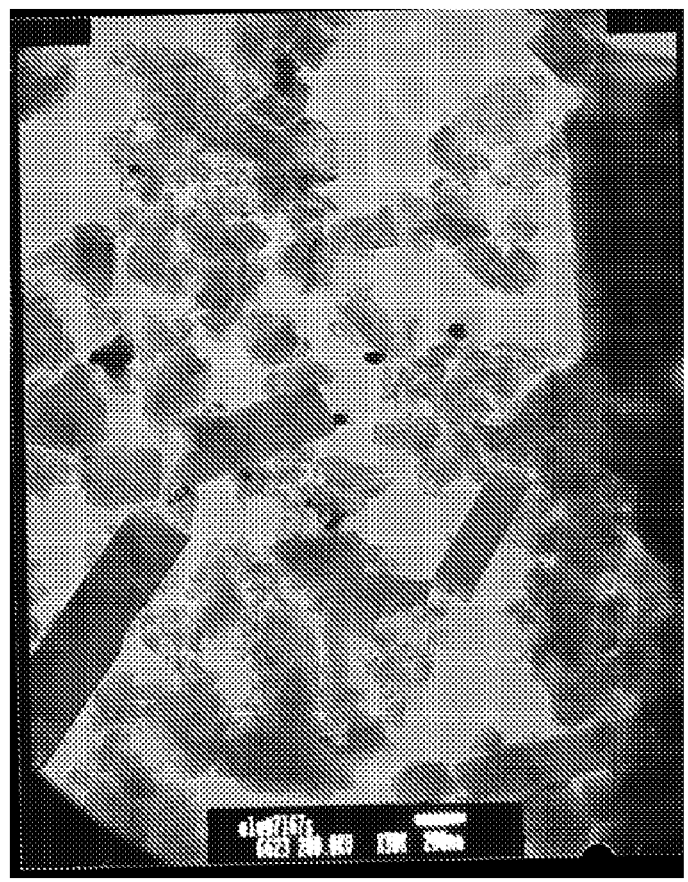

HRTEM was also performed with Ag-alumina samples aged in $CH_4$—NO—$O_2$—$SO_2$ for various times, as shown in FIGS. 3(a) and 3(b). FIGS. 3(a) and 3(b) are micrographs of AlAg (7.1,L) aged in $CH_4$—NO—$O_2$—$SO_2$ gas mixtures at 625° C. for 10 h and 67 h, respectively. After sulfation for 10 h, silver is still well dispersed and only a few particles <20 nm were observed, as can be seen in FIG. 3(a). This behavior is in sharp contrast to the case of FIG. 2(a), where the dispersion of silver was drastically lower as evidenced by the appearance of large silver particles after aging for a shorter time in the absence of $SO_2$. After sulfation for 67 h (FIG. 3(b)), a few silver particles of ~100 nm size were present, but most silver remained dispersed. This observation is very different from the severely sintered silver particles (>1 µm, FIG. 2(c)) observed after aging the catalyst in the absence of $SO_2$. Without being bound by theory, it is believed that $SO_2$ plays an important role in suppressing the sintering of silver on alumina.

Figure 4A:
FIG. 4(a) is an HRTEM image of fresh AlAg (10.1,CG)
Figure 4B:
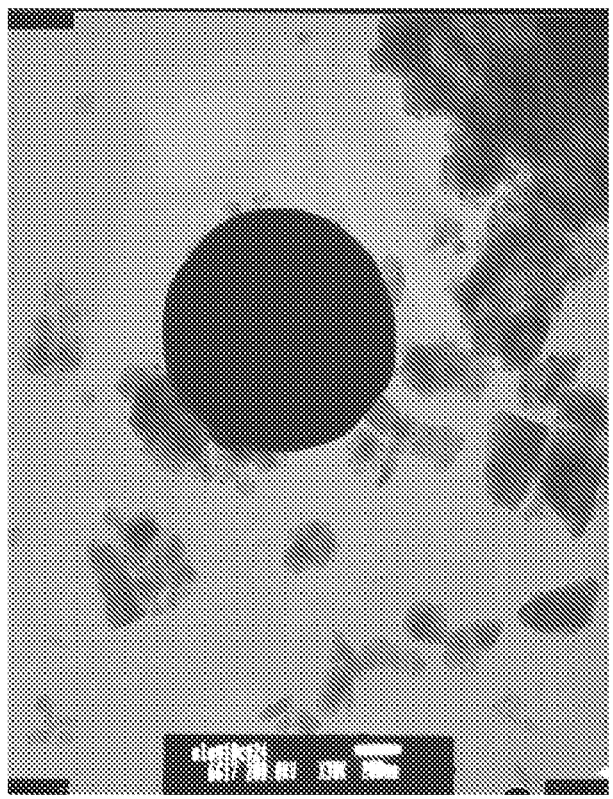
FIG. 4(b) is an HRTEM image of AlAg (10.1,CG) aged in the absence of $SO_2$ (625° C., 0.25% NO-2% $CH_4$-5% $O_2$—He, 24 h).
Figure 4B:
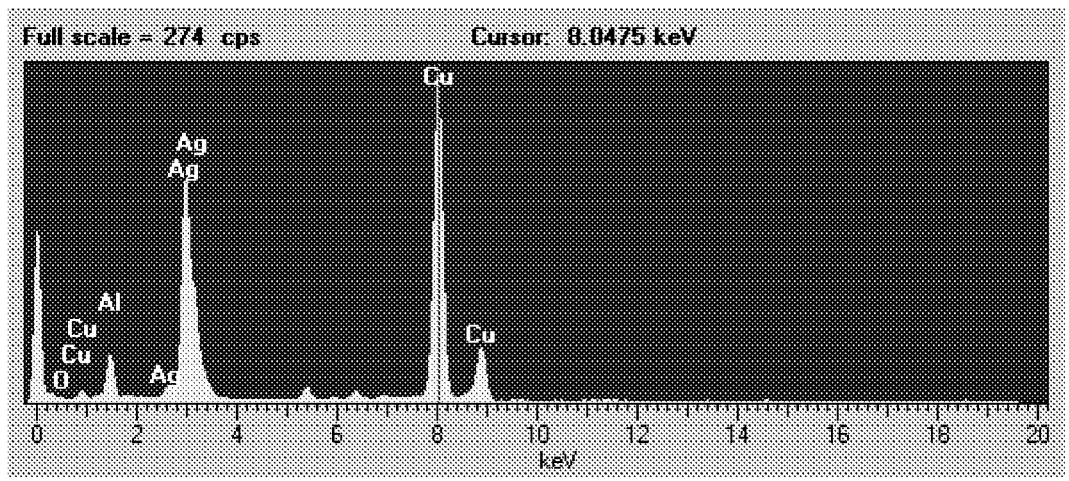

To examine the generality of this stabilization effect of $SO_2$ on silver structures, a high-silver content catalyst, AlAg (10.1,CG), which initially contains silver nanoparticles of 10-20 nm as in FIG. 4(a), was studied. As a result of reaction at 625° C., large silver particles reaching micrometer size were formed after aging in the $SO_2$-free gas for 24 h (FIG. 4(b)). On the sulfated sample, however, no such severely sintered silver particles were observed, and most of the silver was well dispersed (data not shown). Therefore, the beneficial structural effect of $SO_2$ also holds for the unleached, high-silver content AlAg (10.1,CG) sample.

Figure 5:
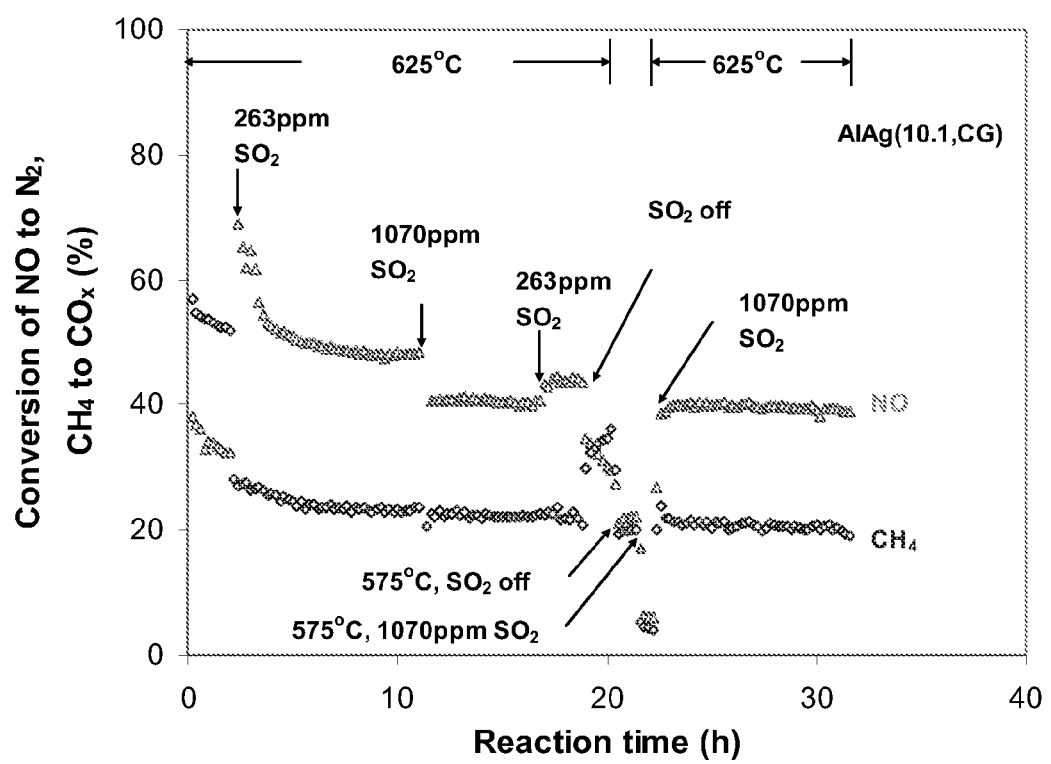
FIG. 5 is a plot of conversion of NO to $N_2$ and $CH_4$ to $CO_x$ vs. time that shows effect of $SO_2$ on the SCR of NO with $CH_4$ over AlAg (10.1,CG). The conditions included: catalyst load: 0.15 g; feed gas: 0.25% NO-2% $CH_4$-5% $O_2$-0/263/1070 ppm $SO_2$—He, 200 ml/min; and T=625° C.

Similar to the activity tests for the leached AlAg (6,L) in FIG. 1, the conversion of NO over AlAg (10.1,CG) decreases with time in the absence of $SO_2$, while it is maintained at high levels with addition of $SO_2$, as shown in FIG. 5. For this high-silver content catalyst, there is even an enhanced SCR activity derived by the presence of $SO_2$, as can be seen by the improved NO conversion to $N_2$ in FIG. 5. Thus, next examined was the possibility that silver re-dispersion by $SO_2$ could be responsible for this enhanced activity.

Figure 6:
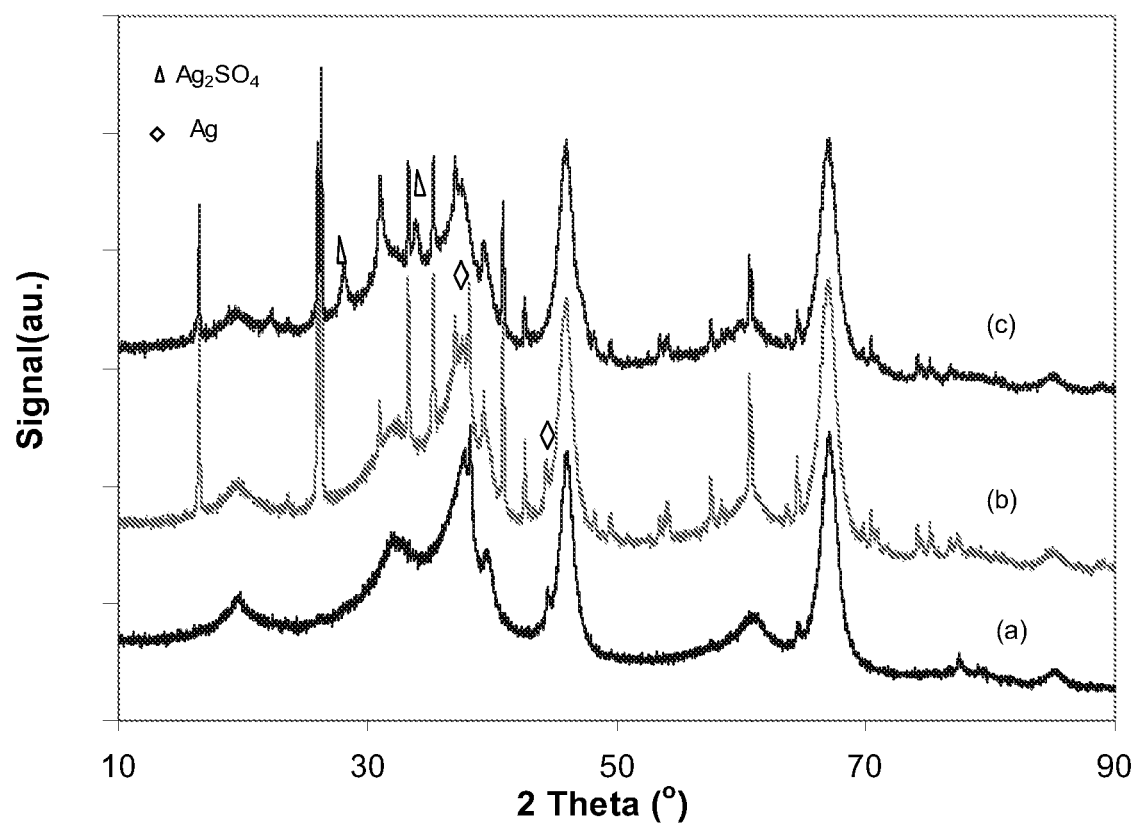
FIG. 6 is an X-ray diffraction (XRD) pattern of (a) aged Ag-alumina catalyst AlAg (10.1,CG) (625° C.-SCR-24 h); (b) aged Ag-alumina catalyst AlAg (7.1,L) (625° C.-SCR-60 h); and (c) aged Ag-alumina catalyst AlAg (7.1,L) (625° C.-SCR-$SO_2$-67 h). The aging conditions included 0.25% NO-2% $CH_4$-5% $O_2$-0/1000 ppm $SO_2$—He, and T=625° C.

XRD analysis was used to examine differently aged samples, as shown in FIG. 6. Diffraction lines due to metallic silver were identified at 2θ of 38.2° (111) and 44.4° (200) for two catalysts aged in $CH_4$—NO—$_2$, AlAg (7.1,L)(625C-SCR-60 h) (pattern b) and AlAg (10.1,CG)(625C-SCR-24 h) (pattern a). Based on the Ag (111) planes, the crystal size of silver for these two catalysts was calculated to be 43.6 nm and 38.4 nm, respectively. The thus obtained average crystal size by XRD was much smaller than the size of silver agglomerate identified in FIG. 2(c) and FIG. 4(b) by TEM, which may be due to that XRD averages over the entire sample. XRD analysis was also performed on the above two catalysts aged in $CH_4$—NO—$O_2$—$SO_2$ for 24 h at 625° C., and neither metallic silver nor $Ag_2SO_4$ phase was identified. Also shown in FIG. 6 is the XRD pattern of AlAg (7.1,L)(625C-SCR-$SO_2$-67 h), aged in $SO_2$ for a longer time, 67 h (pattern c). No metallic silver phases exist in this sample. $Ag_2SO_4$ was identified at 2θ of 28.2° and 34.0°, and its crystal size was calculated to be 17.8 nm from the peak at 34.0°.

Figure 7A:
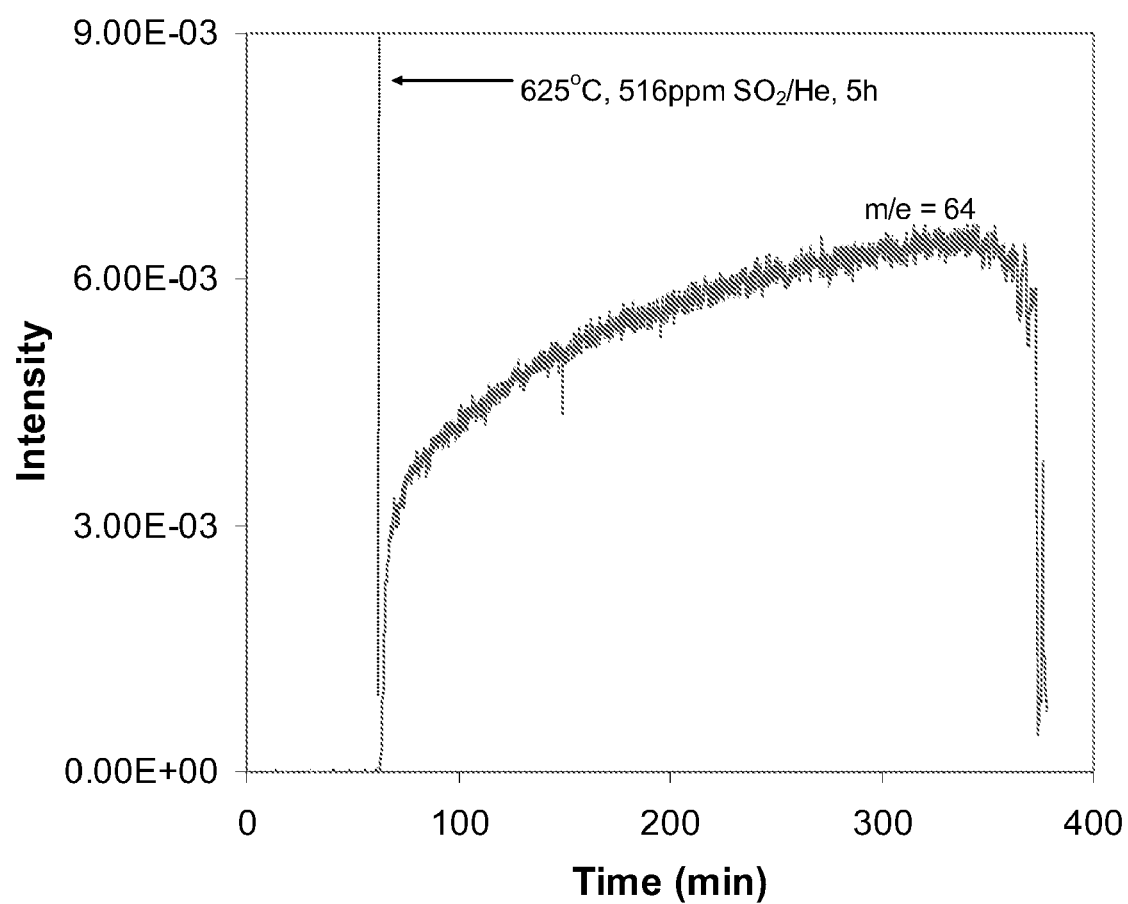
FIGS. 7(a) and 7(b) are plots of intensity vs. time that show the signal of $SO_2$ monitored by mass spectrometry in two sequential $SO_2$-treatments of AlAg (10.1,CG) (625° C.-SCR-24 h), i.e., at 625° C. for 5 h (FIG. 7(a)) and the extended treatment for 9 h (FIG. 7(b)). The conditions of treatment included: T=625° C., 516 ppm $SO_2$/He.
Figure 7B:
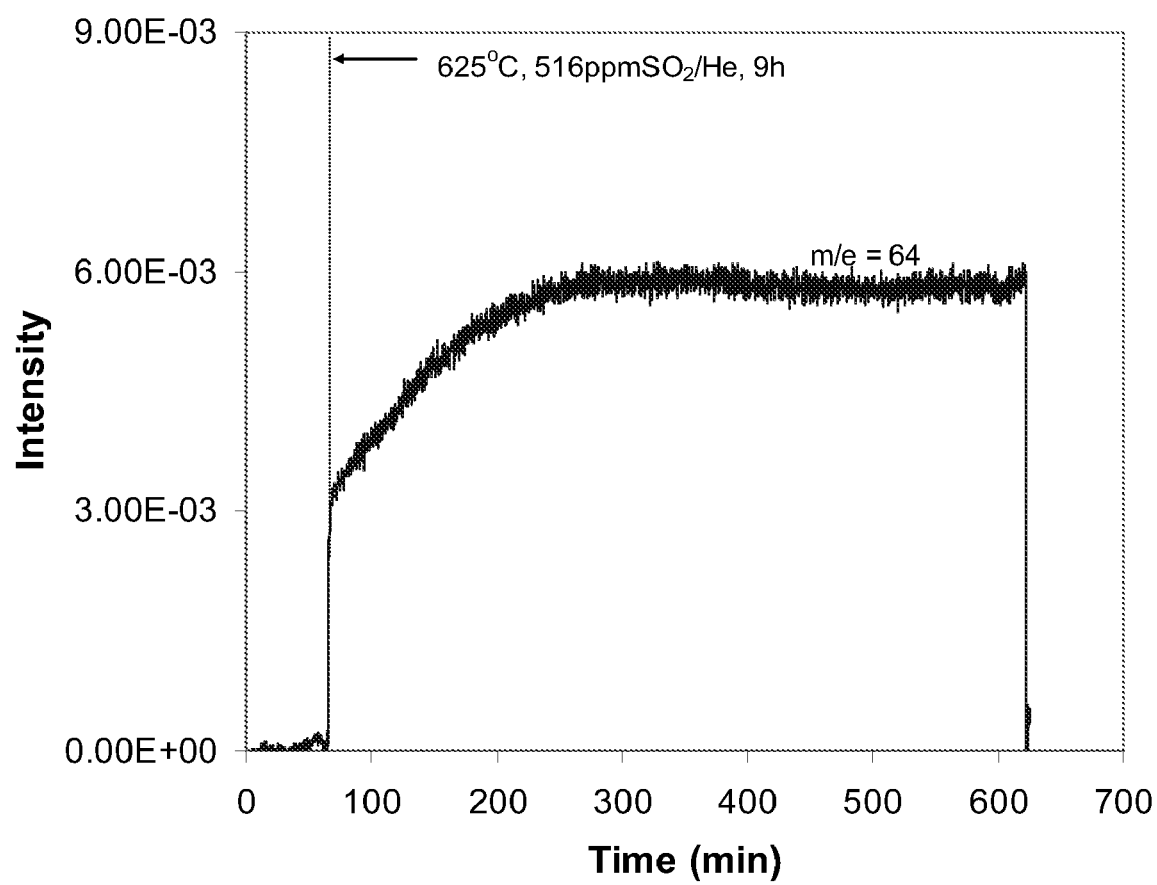
Figure 8:
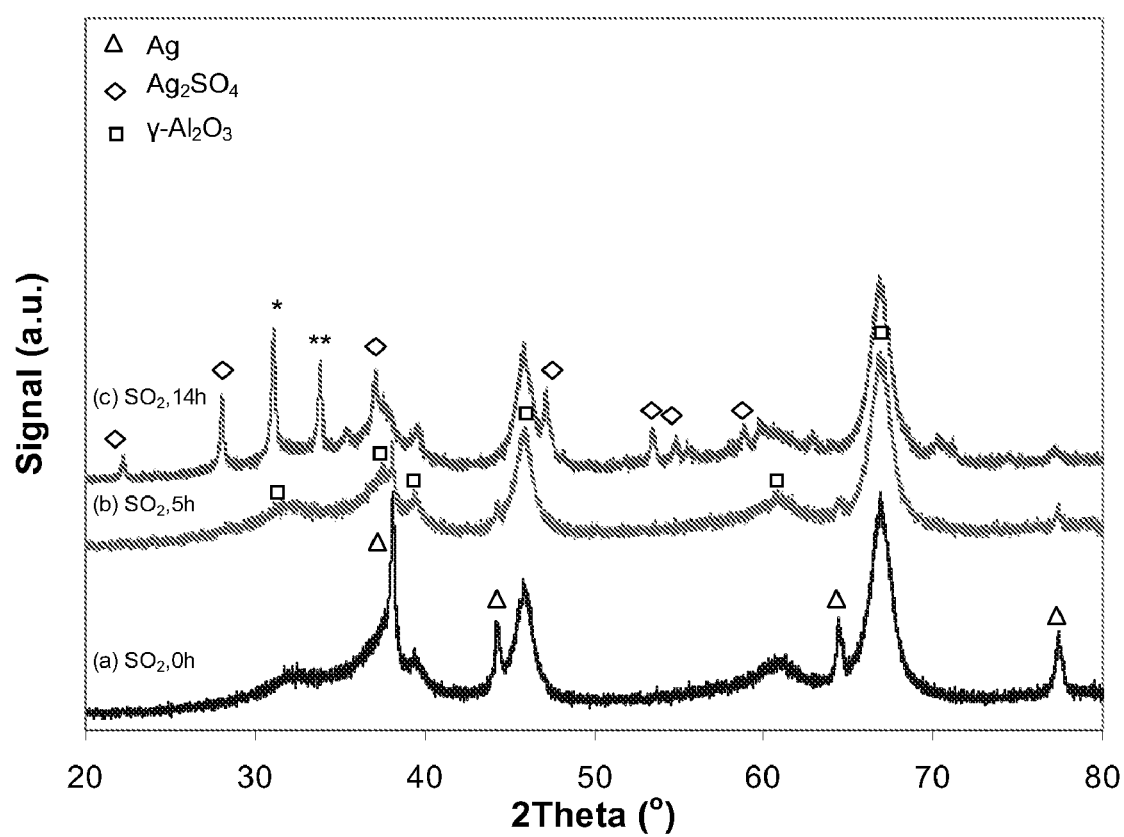
FIG. 8 is a time-resolved XRD pattern of AlAg (10.1, CG) (625° C.-SCR-24 h) upon $SO_2$ treatment at 625° C. for (a) 0 h; (b) 5 h (the catalyst after treatment in FIG. 7(a)), and (c) 14 h (the catalyst after treatment in FIG. 7(b)). The conditions of treatment included: T=625° C., and 516 ppm $SO_2$/He. (*: This diffraction line can not be unambiguously ascribed to $Ag_2SO_4$, $Al_2S_3$, or $Al_2O_3$, since all three of these have diffraction line at this position. **: Diffraction due to $Ag_2SO_4$ or $Al_2(SO_4)_3$ occurs at this position.)
Figure 9:
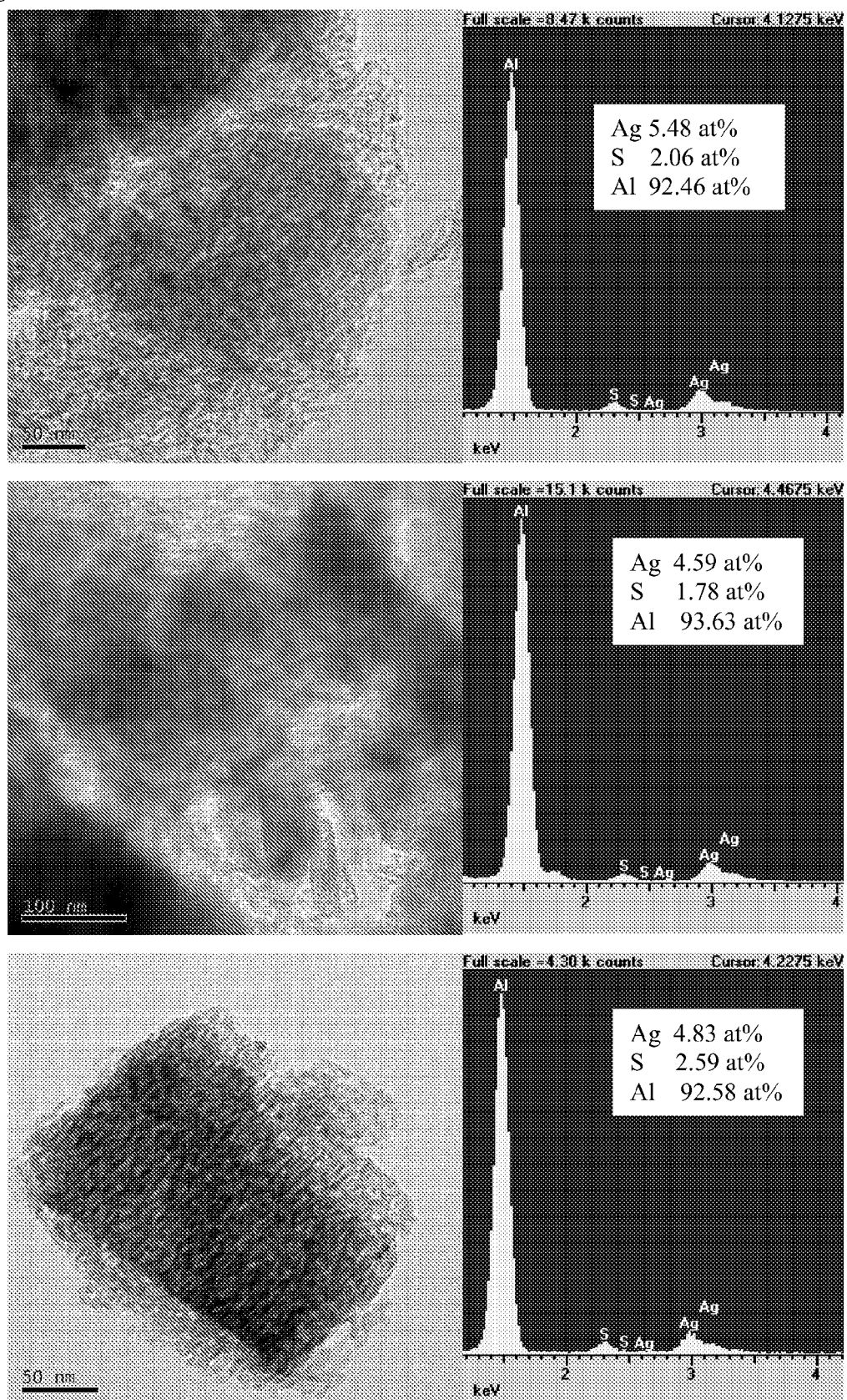
FIG. 9 are transmission electron microscopy (TEM) images of AlAg (10.1,CG) (625° C.-SCR-24 h) treated in $SO_2$ for 14 h (the catalyst after treatment in FIG. 7(a)). Energy dispersive x-ray spectroscopy (EDS) shows the atomic percent of each element. The conditions of treatment included: T=625° C., and 516 ppm $SO_2$/He.

To further probe the observed SCR activity and stability enhancement of the catalyst, and possible $SO_2$-induced re-dispersion of silver, a series of experiments was conducted in which a pre-sintered Ag-alumina catalyst, AlAg (10.1,CG) (625C-SCR-24 h) was exposed to a flow of $SO_2$ (516 ppm $SO_2$/He, at 625° C.). FIGS. 7(a) and 7(b) show that the concentration of eluted $SO_2$ gradually increases with time-on-stream, which indicates absorption of $SO_2$ by the catalyst. The thus "sulfated" sample was characterized by XRD and TEM, as shown in FIGS. 8 and 9. FIG. 8, pattern a, shows the XRD results of the starting aged material AlAg (10.1,CG) (625C-SCR-24 h), and strong diffraction lines due to metallic Ag were identified in this catalyst. After being treated in $SO_2$ for 5 h, the intensity of those diffraction lines diminished drastically, as shown in FIG. 8, pattern b. The metallic silver phase completely disappeared after further 9 h treatment in $SO_2$ in FIG. 8, pattern c, although the phase due to $Ag_2SO_4$ was identified after the extensive treatment in $SO_2$. Hence, the XRD results support a conclusion that silver particles were re-dispersed by $SO_2$. Further, the morphology of the catalyst treated in $SO_2$ for 14 h was examined by TEM (FIG. 9). No silver particles were identified and silver (sulfur-bounded) was well dispersed as indicated by EDS analysis.

The saturation of the aged catalyst by $SO_2$ takes on the order of 1-3 h, as can be seen in FIGS. 7(a) and 7(b). However, the re-dispersion of silver may have faster dynamics, when the starting sample contains smaller silver particle sizes, and when exposures occur at higher concentrations of $SO_2$ as manifested by the relatively fast cyclic performance in FIGS. 1 and 5.

The data consistently show that $SO_2$ adsorbs reversibly on Ag-alumina under the above reaction conditions. Without being bound by theory, it is believed that the adsorbed $SO_2$ can either change the bonding environment of the alumina surface and hence the bonding strength of Ag atoms or form Ag—$SO_x$ bonds that inhibit migration of silver.

EXAMPLE 2

A 5 wt % Au—$Fe_2O_3$ sample was procured from the World Gold Council (WGC, Gold ref. catalyst No. 60c). This sample was prepared by a co-precipitation method followed by drying and calcination in air at 400° C. This sample, as supplied by the WGC, is designated "fresh" in FIG. 10a. It included iron oxide ($Fe_2O_3$) particles, each 20-60 nm in diameter, with gold distributed in the bulk and on the surface of the $Fe_2O_3$ particles. About 67% of the gold was distributed on the surface of the Fe$_2$O$_3$ particles, as found by chemical analysis (see Deng et al., *Topics in Catalysis* 44:199-208 (2007)). On the surface of the Fe$_2$O$_3$ particles, gold was present as nanoparticles (2-6 nm in size), Au clusters (<1 nm), and Au atoms/ions. The surface area of the fresh sample was 44.2 m$^2$/g.

The fresh sample was heated in an environment containing SO$_2$ and O$_2$ gases to determine whether gold particle would diminish and re-disperse. More specifically, 0.2 g of the fresh sample was heated in 10% O$_2$-5000 ppm SO$_2$—He (at a flow rate of 200 mL/min) from room temperature to 450° C. at a heating rate of 5° C./min and was kept at 450° C. for 4 h.

Figure 10:
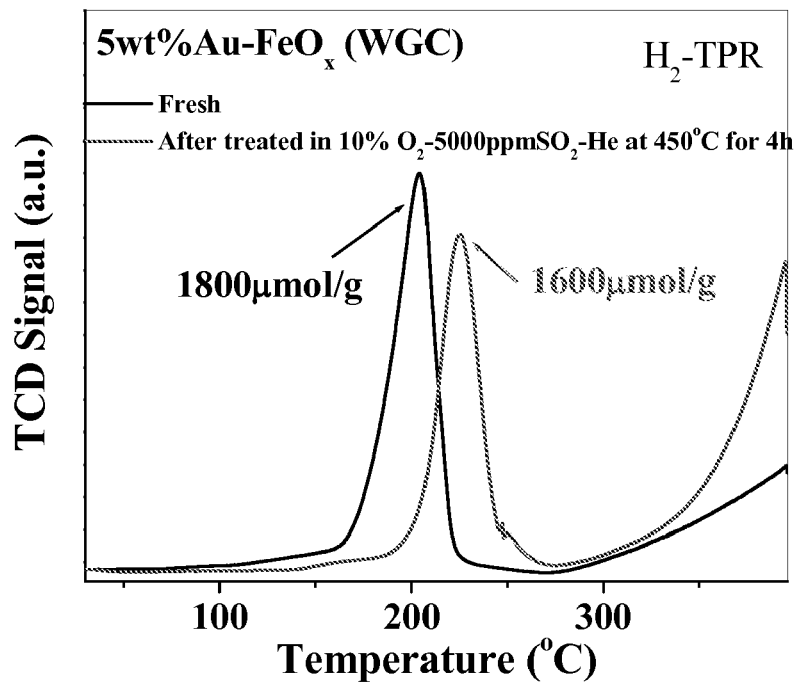
FIG. 10(a) is a plot showing $H_2$-temperature-programmed reduction (TPR) profiles of a 5 wt % $Au/Fe_2O_3$ sample as received and of the sample after treatment in 0.5% $SO_2$-10% $O_2$—He gas mixture at 450° C. for 4 h. TPR test conditions included:
10% $H_2$—Ar with a flow rate of 50 mL/min, T=400° C., and a heating rate of 10° C./min.
FIG. 10(b) is a plot of $SO_2$ partial pressure vs. temperature showing the amount of $SO_2$ produced from the ($SO_2+O_2$)-treated 5 wt % Au—$FeO_x$ sample during $H_2$-TPR in FIG. 10(a).
Figure 10:
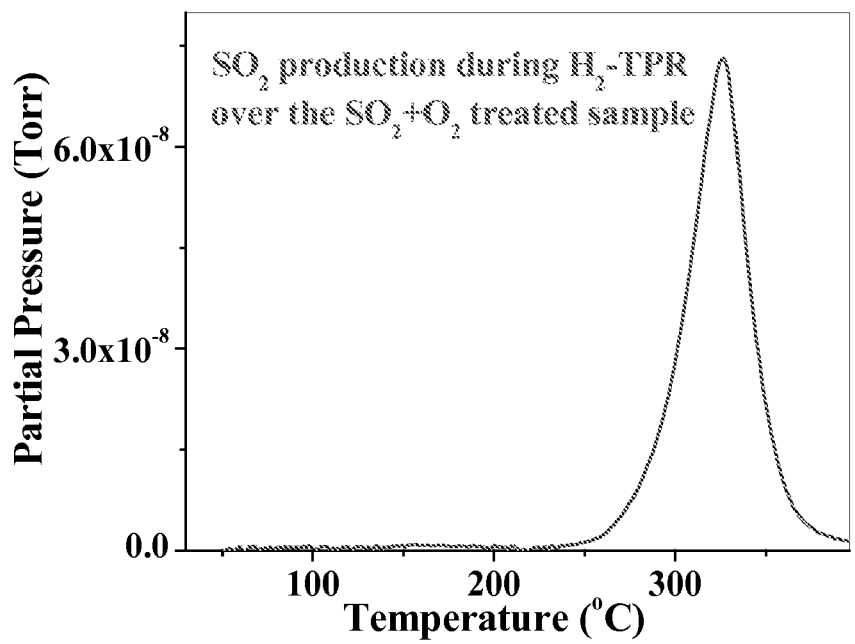

As shown in FIG. 10(*a*), the fresh sample and the SO$_2$-treated sample were tested and characterized by temperature-programmed reduction in H$_2$ (H$_2$-TPR). 0.1 g of each sample was used for this test. The sample was pretreated in He at 100° C. for 30 min, cooled to room temperature, and subjected to the reducing gas, comprising 10% H$_2$—Ar (50 mL/min), from room temperature to 400° C., at a heating rate of 10° C./min. A thermal conductivity detector (TCD) was used to follow hydrogen consumption during the test, while an on-line mass spectrometer was used to detect any H$_2$S/SO$_2$ production. Prior to the TCD, a cooling trap removed any water produced. Consumption of hydrogen is shown as positive peaks in FIG. 10(*a*) (after reversal). As shown in FIG. 10(*a*), the SO$_2$-treated sample began to consume hydrogen at a higher temperature than the fresh sample. In other words, the SO$_2$-treated sample was more difficult to reduce, indicating that a fraction of the gold nanoparticles in the fresh sample was re-dispersed or reduced in size during the SO$_2$ treatment and bound more strongly with the FeOx surface (e.g., by formation of Au—O—Fe sites). Surface iron sulfate was found to be stable up to about 230° C. Above this temperature, this sulfate was reduced by the flowing hydrogen to produce SO$_2$, as shown in FIG. 10(*b*).

OTHER EMBODIMENTS

While a number of embodiments are described herein, the invention is not so limited. For example, the catalyst need not be limited to silver-containing or gold-containing catalysts and can contain other noble metals such as palladium. Alternatively, the metal particle diminution and re-dispersion by SO$_2$ can take place on the surface of supports other than alumina or iron oxide. Other oxide supports and partially sulfated supports can be used in a similar fashion, such as oxides including the rare earth elements (e.g., La, Ce, Pr, and Gd), oxides of transition metal (e.g., Zn, Fe, Cu, Co, Ni, Zr, and Ti), oxides of alkali or alkaline earth elements, and mixtures thereof. Further, diminution of the gold or silver nanoparticles by treatment with SO$_2$ can take place at a temperature different from those mentioned herein, depending on the metal-support combination. Further, the methods of the invention can be applied for other purposes. For example, when selecting the catalyst and reaction conditions, it may be desirable in some cases to run tests with a gas mixture containing a small amount of SO$_2$, which would preserve the dispersed state of the metal, improve stability, and extend the catalyst lifetime, as described in Example 1 above. In addition, someone skilled in the art, may well recognize how to use the dispersant gas, e.g. SO$_2$ or a mixture of SO$_2$ and O$_2$, as promoters in certain reactions to preserve the dispersed state of the metal atoms/clusters on a support surface during the reaction, thereby eliminating the need for frequent catalyst regeneration through after-treatment. Hence, the examples described herein are to be construed as merely illustrative, and not limitative of the remainder of the disclosure in any way whatsoever.

Other embodiments are within the scope of the following claims.

What is claimed is:

1. A method, comprising:
   contacting a catalyst comprising a metal having an average particle size of approximately one nanometer or greater with SO$_2$; and
   reducing the average particle size of the metal or re-dispersing the metal.

2. The method of claim 1, wherein the metal comprises silver or gold.

3. The method of claim 1, wherein the catalyst comprises the metal supported on a substrate.

4. The method of claim 3, wherein the metal has a concentration of at least 0.3 wt %.

5. The method of claim 3, wherein the metal has a concentration of at least 0.5 wt %.

6. The method of claim 1, wherein the SO$_2$ is in a mixture of gases.

7. The method of claim 6, wherein the SO$_2$ has a concentration of at least 10 ppm.

8. The method of claim 6, wherein the SO$_2$ has a concentration of at least 50 ppm.

9. The method of claim 1, wherein the catalyst comprises silver and aluminum oxide.

10. The method of claim 9, wherein the catalyst is contacted with SO$_2$ at 600° C. or higher.

11. The method of claim 1, further comprising, prior to contacting the catalyst with SO$_2$, heating the catalyst in an environment substantially free of SO$_2$.

12. The method of claim 1, further comprising, prior to contacting the catalyst with SO$_2$, heating the catalyst in an environment comprising SO$_2$.

13. The method of claim 1, wherein the catalyst is contacted with SO$_2$ for at least 0.1 hours.

14. The method of claim 1, further comprising performing selective catalytic reduction of NO$_x$ with the catalyst.

15. The method of claim 1, further comprising contacting the catalyst with NO$_x$ and CH$_4$.

16. The method of claim 1, wherein the average particle size is approximately two nanometers or greater prior to contacting the catalyst with SO$_2$.

17. The method of claim 1, wherein the average particle size is approximately five nanometers or greater prior to contacting the catalyst with SO$_2$.

18. The method of claim 1, wherein the average particle size is approximately 100 nanometers or greater prior to contacting the catalyst with SO$_2$.

19. The method of claim 1, wherein the contacting step is performed in a catalytic reaction that requires the catalyst.

20. The method of claim 1, further comprising, after the reducing step, catalyzing a reaction using the catalyst containing the metal whose average particle size, remains substantially unchanged or is further reduced.

21. The method of claim 20, wherein catalyzing the reaction is performed in the presence of SO$_2$.

22. The method of claim 1, further comprising, after the re-dispersing step, catalyzing a reaction using the catalyst in which the catalyst remains dispersed.

23. The method of claim 22, wherein catalyzing the reaction is performed in the presence of SO$_2$.

24. The method of claim 1, wherein the catalyst comprises gold and iron oxide.

25. The method of claim 24, wherein the catalyst is contacted with SO$_2$ at a temperature between 400° C. and 600° C.

* * * * *